2 Sheets—Sheet 1.
A. D. EDDY & H. J. STOLZENBACH.
MORTISING-MACHINE.
No. 191,947. Patented June 12, 1877.
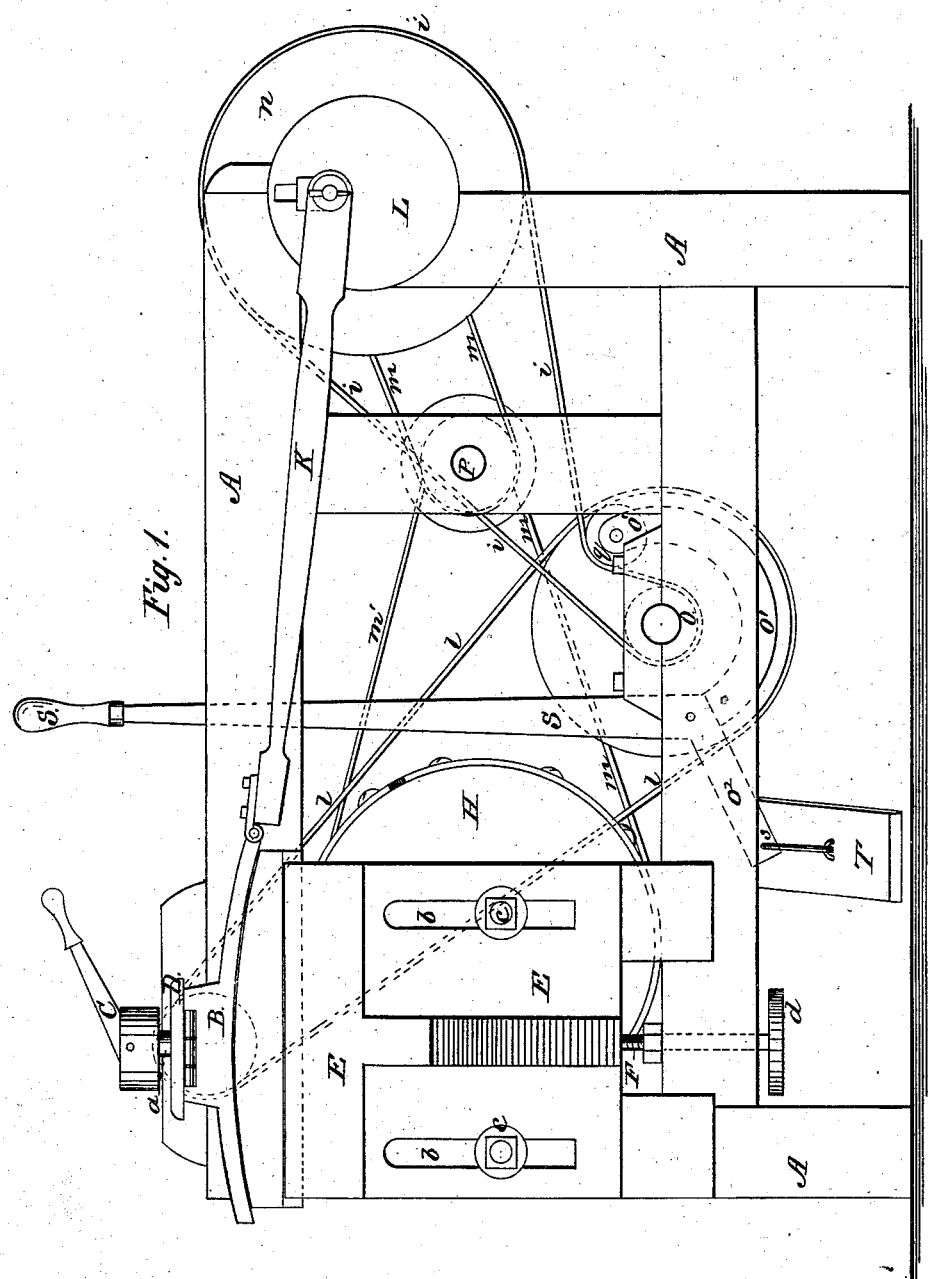

2 Sheets—Sheet 2.
A. D. EDDY & H. J. STOLZENBACH.
MORTISING-MACHINE.
No. 191,947. Patented June 12, 1877.
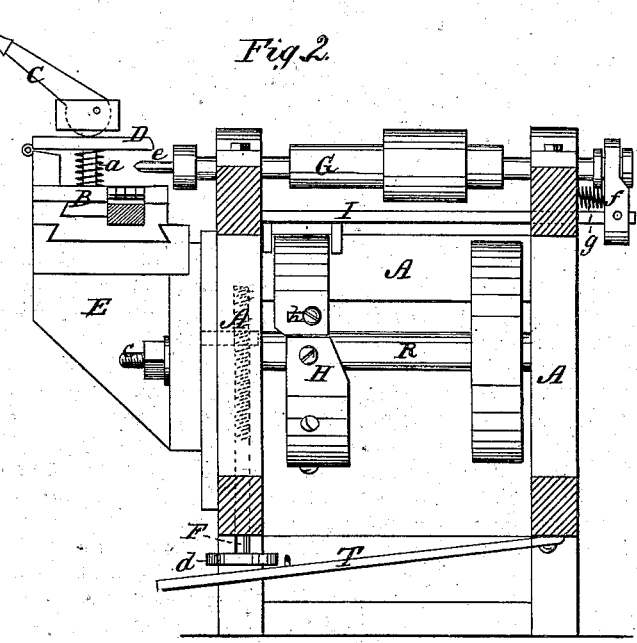
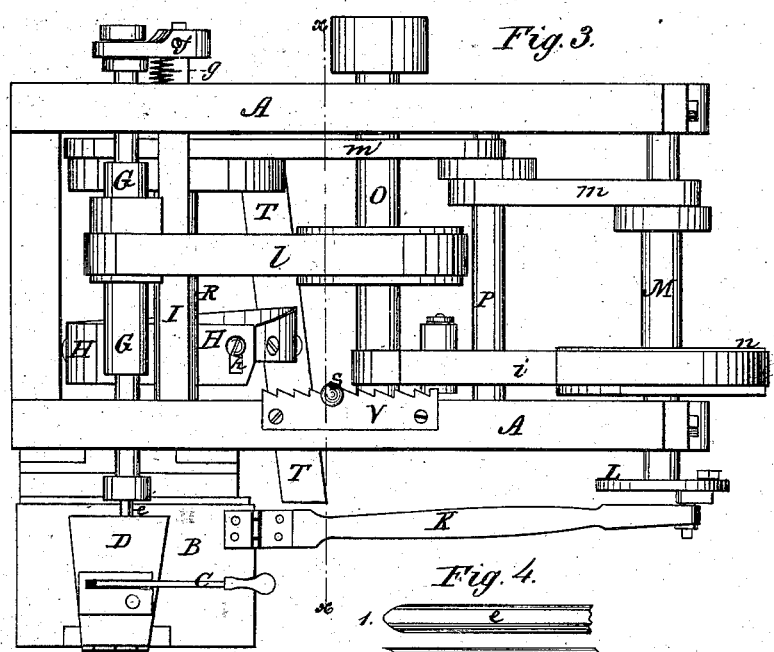
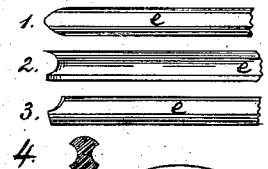
WITNESSES:
W. W. Hollingsworth
John C. Kernon
INVENTOR:
A. D. Eddy
H. J. Stolzenbach
BY
ATTORNEYS.
N. PETERS, PHOTO-LITHOGRAPHER, WASHINGTON, D. C.

UNITED STATES PATENT OFFICE.

ALFRED D. EDDY AND HENRY J. STOLZENBACH, OF TIFFIN, OHIO.

IMPROVEMENT IN MORTISING-MACHINES.

Specification forming part of Letters Patent No. 191,947, dated June 12, 1877; application filed April 2, 1877.

*To all whom it may concern:*

Be it known that we, ALFRED D. EDDY and HENRY JOSEPH STOLZENBACH, of Tiffin, in the county of Seneca and State of Ohio, have invented an Improvement in Mortising-Machines; and we do hereby declare that the following is a full, clear, and exact description of the same.

This invention is an improvement in that class of mortising-machines in which the boring and cutting tool is caused to advance as the table carrying the stuff to be mortised is reciprocated in a direction at right angles thereto.

The improvement relates to the construction and arrangement of parts, as hereinafter described.

In the accompanying drawing, forming part of this specification, Figure 1 is a side elevation of the machine. Fig. 2 is a cross-section on line $x\ x$, Fig. 3. Fig. 3 is a top-plan view of the machine. Fig. 4 represents the mortising-tool, 1 and 3 being views of the opposite rounded sides thereof, 2 a view of one of the grooved sides, and 4 a cross-section.

The movable or working parts of the machine are attached to or mounted in a suitable stationary frame, A. The stuff to be mortised is clamped upon the reciprocating table B by means of a cam-lever, C, which is pivoted to the head of a post, $a$, fixed in said table, and acts upon a bar or plate, D, hinged at the side of the table. The post $a$ passes through the bar D, and is encircled by a spiral spring, which serves to raise the bar and hold its free end elevated, except when the cam-lever is depressed for clamping the stuff. The table B and also its bed are made arc-shaped or convex, so that curved stuff may be clamped on the table and a curved mortise cut therein. The table works in suitable guides upon a right-angular bracket, E, whose vertical portion has parallel vertical slots $b$, to receive the studs or screws $c$, by which the bracket is guided when being raised or lowered by the screw F. The guide and clamping-screws $c$ are provided with nuts, so that they may serve as means for clamping the bracket in any desired adjustment. The said screw F works vertically in suitable guides, and is connected with a lateral arm of bracket E. It is provided with a hand-wheel, $d$, for rotating it, for the purpose of effecting the desired vertical adjustment of the bracket and table, as required by the thickness of the stuff to be mortised, or the width of the mortise to be formed therein.

The boring or mortising tool $e$ is grooved lengthwise on opposite sides and notched at the end, thus forming a cutting and clearing edge or lip. The tool may be sharpened by deepening the notch, thus leaving the diameter of the tool uniform. The tool is fixed in mandrel G, which is placed at right angles to the direction of motion of table B, and is provided with elongated journals to adapt it to slide lengthwise in its bearings, for the purpose of causing the tool $e$ to advance as it rotates, and thereby deepen the groove or mortise made in the stuff clamped upon the table.

The means for feeding the tool $e$, or causing it to advance when making it cut, are a cam-wheel, H, and a sliding bar, I, the latter having fixed pendent arms, which embrace the irregular periphery of cam H, and being placed parallel to mandrel G, to which it is rigidly connected by a short bar, $f$. A spring, $g$, acts against the said bar $f$, for suddenly retracting the mandrel G and sliding bar I when the cam-wheel has completed its revolution, and thereby suddenly drawing back the tool after its cut has been completed. This movement of bar I is provided for by an abrupt lateral shoulder or offset in the periphery of the cam.

The periphery of the cam is formed of a metal plate, having transverse slots $h$ to receive screws, by which it fastened to the wheel proper. These slots permit it to be adjusted laterally, as required, to vary the throw of the cam and the lengthwise movement of the bar I and mandrel G. Thus the depth of the mortise may be varied as required by adjusting the rim of the cam toward or from the table B.

The table B is connected by rod K with a disk, L, fixed on a pulley-shaft, M, and having a radial slot to provide for adjustment of the wrist-pin of said rod K, and thereby regulating the movement of the table.

The mandrel G and shaft M derive rotary motion directly from driving-shaft O by means of belts $i\ l$. Motion is then communicated by belt $m$ from shaft M to a counter-shaft, P, and thence to cam-wheel shaft R by belt $m'$. The belt $i$ is loose on the shaft O and pulley $n$, and a belt-tightening device is hence required to set the mandrel and table in motion. Said device consists of a pivoted bell-crank lever, S, having a bent arm, $o^1$, which carries an idle-pulley, $q$, Fig. 1. A treadle, T, is connected with the short arm $o^2$ of the lever, and the larger arm thereof engages a ratchet-bar, V, fixed to the frame A of the machine. Thus, when the stuff to be mortised has been clamped on table B, the operator applies his foot to the free end of the treadle T, thereby bringing the pulley forcibly in contact with the belt $i$, and tightening the same, so that the motion of driving-shaft O is at once communicated simultaneously to the mandrel G and shaft M. The longer arm of lever S is, at the same time, locked with the teeth of ratchet-bar V, so that the lever is held in the position required for holding the belt taut. The lever S may be quickly disengaged from the ratchet-bar by pushing it laterally, when, the belt $i$ being slacked, the motion of mandrel and table will be arrested.

We do not claim, broadly, reciprocating a mandrel by means of a cam-wheel and connecting-rod, nor a mortising-tool having a notched end and rabbeted side; but

What we claim is—

1. The mortising-tool $e$, having opposite lengthwise semicircular grooves and a curved or semicircular notch in its cutting end between the rounded cutters, whereby said tool is adapted to be sharpened by deeping the notch, without thereby decreasing the diameter of the tool at that point, as set forth.

2. In a mortising-machine, the combination of the convex bed and reciprocating concave table, the two being connected by a tongue and groove, a device for clamping the work upon the table, and a mandrel revolving in fixed bearings, all constructed and arranged as shown and described, to operate as and for the purpose specified.

3. In a mortising-machine, in combination with the reciprocating table B, the bar D, hinged at the outer side thereof, the post $a$, fixed in the table and projecting through said bar, the cam-lever C, pivoted to the top of the post, and the spring, arranged as shown and described, for the purpose described.

4. In a mortising-machine, the combination of the cam-wheel H, the reciprocating bar I, having arms or pins for embracing the periphery of said wheel, the mandrel G, carrying tool $e$, the connecting-bar $f$, and spring $g$, the reciprocating bar and mandrel being arranged parallel, all as shown and described, to operate as and for the purpose specified.

5. In a mortising-machine, the cam-wheel proper, having the peripheral plate, provided with slots and secured by clamp-screws, whereby the throw of the cam may be raised by adjusting the said plate, as set forth.

ALFRED D. EDDY.
HENRY JOSEPH STOLZENBACH.

Witnesses:
  PHILIPP EMICH,
  DENNIS HALLINAN.